(12) United States Patent
Nakao et al.

(10) Patent No.: US 7,619,653 B2
(45) Date of Patent: Nov. 17, 2009

(54) MOTION DETECTION IMAGING DEVICE

(75) Inventors: Yoshizumi Nakao, Daito (JP); Takashi Toyoda, Daito (JP); Yasuo Masaki, Daito (JP)

(73) Assignee: Funai Electric Co., Ltd., Daito-shi (JP)

( * ) Notice: Subject to any disclaimer, the term of this patent is extended or adjusted under 35 U.S.C. 154(b) by 315 days.

(21) Appl. No.: 11/828,827

(22) Filed: Jul. 26, 2007

(65) Prior Publication Data

US 2008/0025571 A1    Jan. 31, 2008

(30) Foreign Application Priority Data

Jul. 26, 2006    (JP)    ............................... 2006-203443

(51) Int. Cl.
*H04N 5/228* (2006.01)
*H04N 5/235* (2006.01)
*H04N 5/225* (2006.01)
*G06K 9/00* (2006.01)
*H01L 27/00* (2006.01)

(52) U.S. Cl. ................ 348/208.1; 348/222.1; 348/335; 382/107; 250/208.1

(58) Field of Classification Search ............. 348/208.1, 348/208.4, 208.14, 222.1, 239, 296, 297, 348/335, 340, 343, 152–155; 382/107; 250/208.1
See application file for complete search history.

(56) References Cited

U.S. PATENT DOCUMENTS 7,116,477 B2 * 10/2006 Nishihara et al. ........... 359/462
7,315,014 B2 * 1/2008 Lee et al. .................. 250/208.1
7,317,494 B2 * 1/2008 Mashitani et al. ........... 348/739
2004/0212677 A1 * 10/2004 Uebbing ..................... 348/155
2006/0044451 A1 * 3/2006 Liang et al. ................. 348/340
2006/0087430 A1 * 4/2006 Zambon ..................... 340/567
2009/0127430 A1 * 5/2009 Hirasawa et al. ......... 250/201.8
2009/0167922 A1 * 7/2009 Perlman et al. ............. 348/340

FOREIGN PATENT DOCUMENTS

| JP | 8-106534 A | 4/1996 |
|---|---|---|
| JP | 2524818 B2 | 5/1996 |
| JP | 11-352550 A | 12/1999 |
| JP | 2001-177836 A | 6/2001 |
| JP | 2003-32552 A | 1/2003 |
| JP | 2004-171431 A | 6/2004 |

* cited by examiner

*Primary Examiner*—Nhan T Tran
*Assistant Examiner*—Trung Diep
(74) *Attorney, Agent, or Firm*—Crowell & Moring LLP

(57) ABSTRACT

A motion detection imaging device comprises an imaging element and an optical lens system for collecting light entering in a capture range to form images on the imaging element. The optical lens system comprises: an optical lens array having center lenses for collecting light in a front capture range and left/right side lenses for collecting lights in side capture ranges; and prisms for guiding lights in the side capture ranges to the side lenses. The imaging device further comprises: a timing generator for allowing images formed by the lenses to be imaged with a time difference between in-row images; and a microprocessor for reproducing wide angle images from the in-row images by one operation of a shutter to detect movement of a target based on difference between the wide angle images. The imaging device with simple structure can monitor, with high probability, a target moving fast in a wide range.

6 Claims, 9 Drawing Sheets

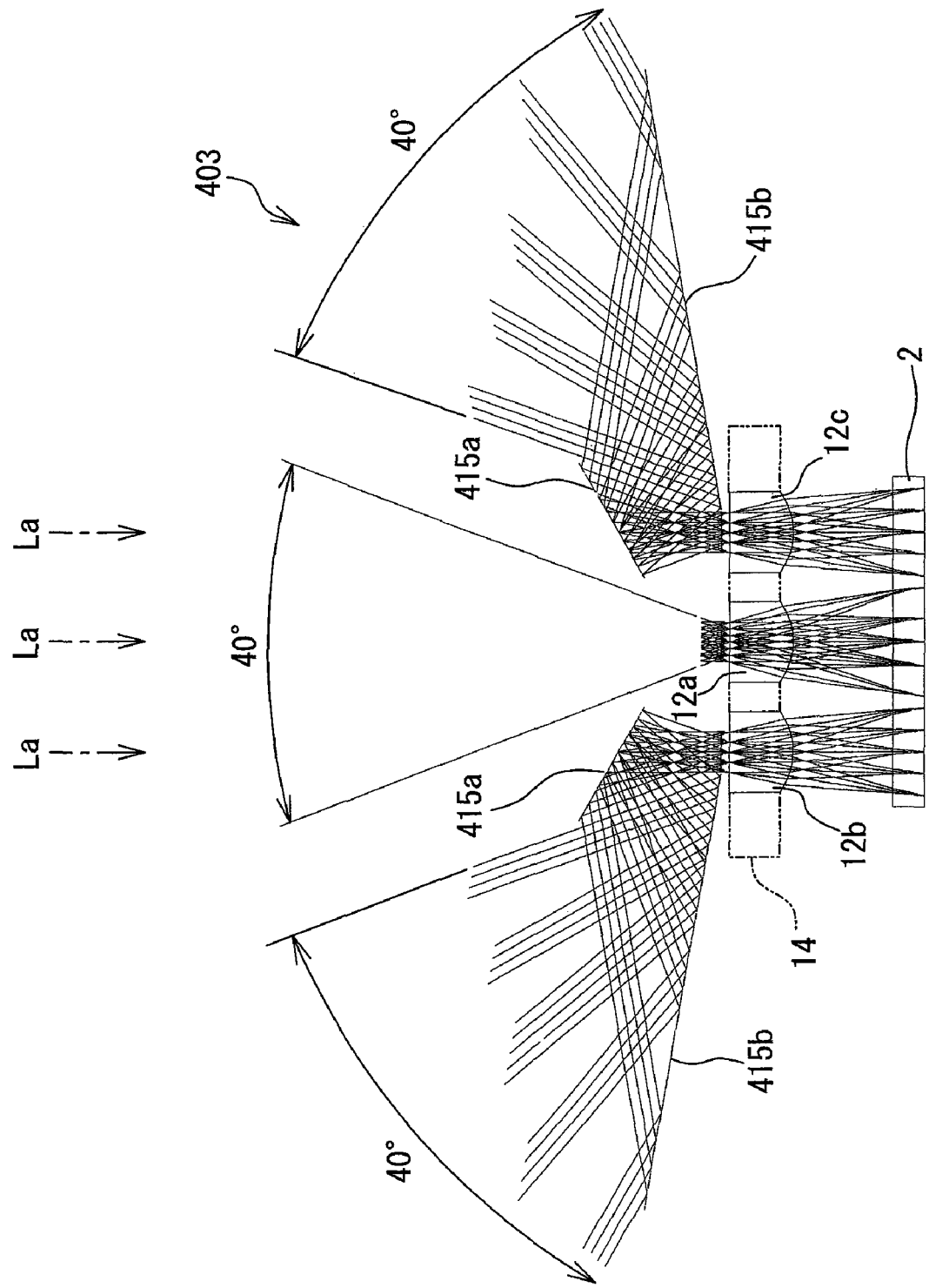

MOTION DETECTION IMAGING DEVICE

BACKGROUND OF THE INVENTION

1. Field of the Invention

The present invention relates to a motion detection imaging device.

2. Description of the Related Art

A motion detection imaging device is known which calculates a difference between images captured with a time difference on a solid-state imaging element, and detects movement or motion of a target object (to be captured or imaged) based on the calculated difference (refer to e.g. Japanese Laid-open Patent Publication 2003-32552). It is also know to detect a moving object based on a difference between digitized images (refer to e.g. Japanese Laid-open Patent Publications 2001-177836, 2004-171431 and Hei 8-106534). On the other hand, an electronic still camera is known which uses an image sensor with a light receiving surface having divided light receiving areas, and sequentially exposes images of a target object on the light receiving areas so as to allow images in the light receiving areas to be read out all together, thereby shortening the interval between shots in continuous shooting mode (refer to e.g. Japanese Laid-open Patent Publication Hei 11-352550). Furthermore, a camera is known which has four photographing lenses that are placed in front of a film so as to be fit in a frame of a film, in which a slit member is provided to pass in front of the photographing lenses sequentially so as to record continuous frame segments in a frame of the film (refer to e.g. Japanese Patent 2524818).

Examples of the actual use of the motion detection imaging device such as described in the above-cited Japanese Laid-open Patent Publication 2003-32552 are monitor cameras such as rear monitor cameras for cars. In monitor cameras, it is desirable that the motion detection range is as wide as possible. For example, in the case of a room monitor camera placed on a wall of a room, it is desirable that the monitor camera can monitor a wide range (capture range or picture-taking range) over the entire area of the room in order to simplify the monitoring system and reduce the installation cost. However, in order for one room monitor camera to be able to image substantially the entire area of the room, it is normally required to use an optical lens having a view angle of at least 120° (degrees). Generally, an optical lens having a view angle much greater than 60°, as can be represented by a fisheye lens, causes a resultant image captured by the optical lens to have barrel distortion. This requires the use of complex programs to digitally correct the barrel distortion.

On the other hand, in order to monitor a range of at least 120° using a monitor camera with an optical lens having a view angle of at most 60°, it becomes necessary to use two or more of such monitor cameras, forming two or more capture ranges, and to adjust to prevent the capture ranges from forming a non-capture area therebetween. In other words, there has not been developed an imaging device for motion detection which is capable of capturing or imaging a wide range with a simple structure. In addition, in order to detect motion, it is necessary to prepare multiple images captured or imaged with a time difference. A conventional monitor camera or a similar device uses a shutter for imaging with a time difference, and opens and closes the shutter at predetermined intervals. However, in the case where the predetermined intervals of the shutter are long (frame rate is low), a problem arises that it is highly unlikely to detect motion of a target object moving at a high speed such as a moving car.

SUMMARY OF THE INVENTION

An object of the present invention is to provide a motion detection imaging device which is capable of imaging in a wide capture range with as simple an optical system as possible without using an optical lens having a view angle much greater than 60°, and which can easily, and at short intervals, capture multiple images for motion detection, thereby preventing lowering of the probability of detecting a target object even when the target moves at a high speed.

According to a first aspect of the present invention, this object is achieved by a motion detection imaging device comprising: a solid-state imaging element with unit pixels arranged in a matrix of rows and columns; and an optical lens system for collecting lights entering in a capture range so as to form, on the solid-state imaging element, images which are imaged with a time difference so as to detect movement of a target object in the images based on a difference between the imaged images, the optical lens system comprising: an optical lens array having multiple optical lenses (hereafter referred to as "center lenses") which are arranged in the direction of the columns of the unit pixels, and into which a light in a predetermined front range in the capture range enters, and also having two sets of multiple optical lenses (hereafter referred to as "left and right side lenses") which are arranged left and right of the center lenses and in the direction of the columns of the unit pixels, and into which lights in predetermined left and right ranges in the capture range enter; and light bending means placed on entrance side of the left and right side lenses for bending and guiding lights entering in the predetermined left and right ranges in the capture range to the left and right side lenses, respectively, directing the lights along optical axes of the left and right side lenses, the solid-state imaging element having image areas for respectively imaging multiple images (hereafter referred to as "single-eye images") formed by the center lenses and the left and right side lenses (such image areas being hereafter referred to as "single-eye image areas").

The motion detection imaging device further comprises: rolling shutter means for allowing the solid-state imaging element to image the single-eye images with a time difference between the single-eye images in the single-eye image areas (hereafter referred to as "in-row single-eye image areas") in adjacent rows of the in-row single-eye image areas, the rows extending in the same direction as the rows of the unit pixels; image combining means for combining, in each of the in-row single-eye image areas, the single-eye images formed by the center lenses from the light entering in the predetermined front range in the capture range with the single-eye images formed by the left and right side lenses from the lights entering in the predetermined left and right ranges in the capture range so as to reproduce a wide angle image, thereby reproducing multiple wide angle images with a time difference between the in-row single-eye image areas; and motion detection means for detecting the target object in the wide angle images based on a difference between the wide angle images reproduced by the image combining means from the single-eye images in the in-row single-eye image areas, respectively.

Preferably, the light bending means comprises prisms.

Further preferably, the light bending means comprises 45-45-90 degree right-angle prisms.

Still further preferably, the light bending means comprises 30-60-90 degree right-angle prisms.

Yet further preferably, the light bending means comprises mirrors.

According to a second aspect of the present invention, the above-described object is achieved by a motion detection imaging device comprising: a solid-state imaging element with unit pixels arranged in a matrix of rows and columns; and an optical lens system for collecting lights entering in a capture range so as to form, on the solid-state imaging element, images which are imaged with a time difference so as to detect movement of a target object in the images based on a difference between the imaged images, the optical lens system comprising: an optical lens array having 3 optical lenses (hereafter referred to as "center lenses") which are arranged in the direction of the columns of the unit pixels, and into which a light in a front range of approximately 40° in the capture range enters, and also having two sets of 3 optical lenses (hereafter referred to as "left and right side lenses") which are arranged left and right of the center lenses and in the direction of the columns of the unit pixels, and into which lights in left and right ranges each of approximately 40° in the capture range enter; and left and right 45-45-90 degree right-angle prisms placed on entrance side of the left and right side lenses, respectively, so as to prevent interruption of the lights entering in the front range of approximately 40° and to bend and guide lights entering in the left and right ranges each of approximately 40° in the capture range to the left and right side lenses, respectively, directing the lights along optical axes of the left and right side lenses, the solid-state imaging element having 9 image areas in a matrix of 3 rows and 3 columns for respectively imaging 9 images (hereafter referred to as "single-eye images") formed by the center lenses and the left and right side lenses (such image areas being hereafter referred to as "single-eye image areas").

The motion detection imaging device further comprises: rolling shutter means for allowing the solid-state imaging element to image the single-eye images with a time difference between the single-eye images in the single-eye image areas (hereafter referred to as "in-row single-eye image areas") in adjacent rows of the in-row single-eye image areas, the rows extending in the same direction as the rows of the unit pixels; image combining means for combining, in each of the in-row single-eye image areas, 3 single-eye images formed by the center lenses from the light entering in the front range of approximately 40° in the capture range with 3 single-eye images formed by each of the left and right side lenses from the lights entering in the left and right ranges each of approximately 40° in the capture range so as to reproduce a wide angle image, thereby reproducing wide angle images each with a picture angle of at least approximately 120° with a time difference between the in-row single-eye image areas; and motion detection means for detecting the target object in the wide angle images based on a difference between the wide angle images reproduced by the image combining means from the single-eye images in the in-row single-eye image areas, respectively.

The motion detection imaging device according to each of the first and second aspects of the present invention uses an optical lens system comprising: an optical lens array having center lenses for collecting light entering in a front range of a capture range, and also having left and right side lenses for collecting lights entering in left and right ranges of the capture range; and light bending means (prisms or mirrors) for guiding the lights entering in the left and right ranges of the capture range to the left and right side lenses. Thus, the motion detection imaging device can capture an image in a wide capture range with a simple optical system without using an optical lens having a view angle much larger than approximately 60°.

In addition, the motion detection imaging device further comprises: rolling shutter means for allowing the solid-state imaging element to image single-eye images with a time difference between the single-eye images in adjacent rows of the single-eye images; image combining means for combining the single-eye images in each of the rows of single-eye images so as to reproduce a wide angle image, thereby reproducing multiple wide angle images with a time difference between the wide angle images in adjacent rows; and motion detection means for detecting a target object in the wide angle images based on a difference between the wide angle images. Thus, the motion detection imaging device can easily, and at short intervals, capture multiple images for motion detection by one operation of a shutter, making it possible to detect, with high detection probability (preventing lowering of the probability), a target object moving at a high speed.

While the novel features of the present invention are set forth in the appended claims, the present invention will be better understood from the following detailed description taken in conjunction with the drawings.

BRIEF DESCRIPTION OF THE DRAWINGS

The present invention will be described hereinafter with reference to the annexed drawings. It is to be noted that all the drawings are shown for the purpose of illustrating the technical concept of the present invention or embodiments thereof, wherein:

FIG. 11 is a schematic optical path diagram of an optical lens system of a motion detection imaging device according to a fourth embodiment of the present invention as seen from the bottom thereof, showing a light flux passing through each of the optical lenses.

DESCRIPTION OF THE PREFERRED EMBODIMENTS

Figure 1:
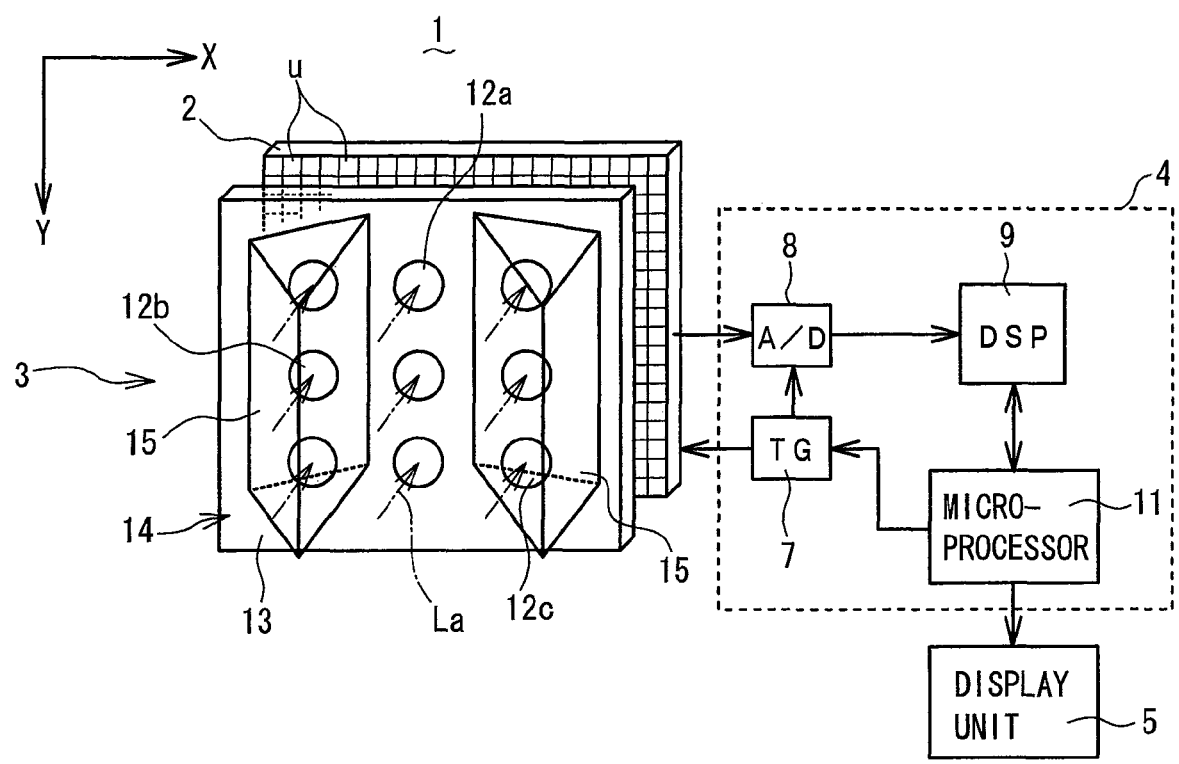
FIG. 1 is a schematic perspective view of a motion detection imaging device, including a solid-state imaging element and an optical lens system, according to a first embodiment of the present invention.

Embodiments of the present invention, as best mode for carrying out the invention, will be described hereinafter with reference to the drawings. The present invention relates to a motion detection imaging device. It is to be understood that the embodiments described herein are not intended as limiting, or encompassing the entire scope of, the present invention. Note that like parts are designated by like reference numerals, characters or symbols throughout the drawings.

First Embodiment

Figure 2:
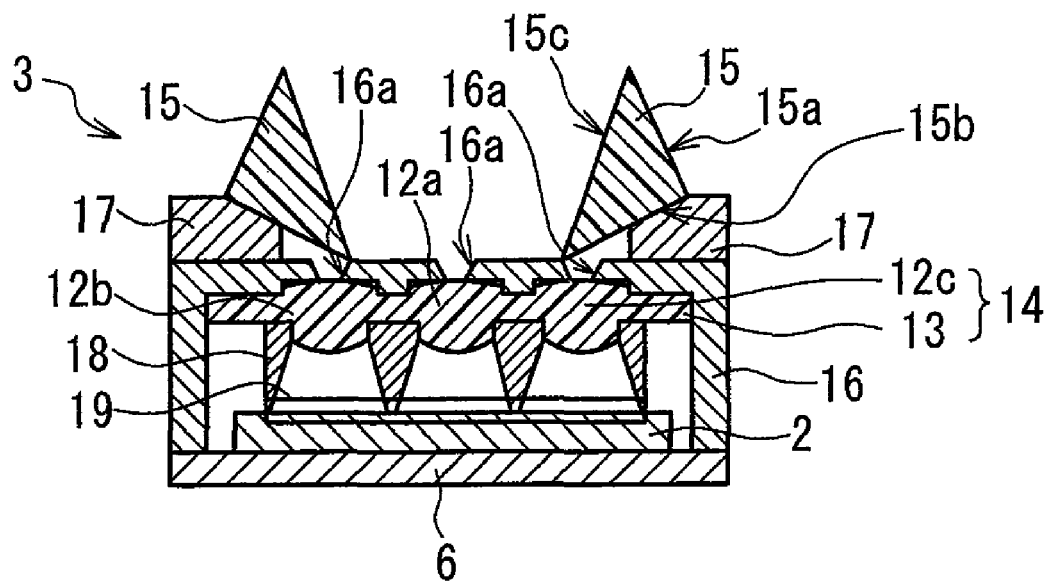
FIG. 2 is a schematic bottom cross-sectional view of the motion detection imaging device of FIG. 1.

Referring to FIG. 1 to FIG. 8, a motion detection imaging device (imaging device for motion detection) 1 according to a first embodiment of the present invention will be described. FIG. 1 is a schematic perspective view of the motion detection imaging device 1 including a solid-state imaging element 2 and an optical lens system 3, while FIG. 2 is a schematic bottom cross-sectional view of the motion detection imaging device 1 of FIG. 1. As shown in FIG. 1, the motion detection imaging device 1 comprises: a solid-state imaging element (photodetector array) 2 having unit pixels "u" arranged in a matrix of rows and columns (X and Y directions); and an optical lens system 3 for collecting light entering in a front capture range (picture-taking range) of 120° so as to form images on the solid-state imaging element 2. The motion detection imaging device 1 further comprises: a motion detection circuit 4 for reading the formed images on the solid-state imaging element 2 as image information to reproduce multiple wide angle images, each of which corresponds to the original capture range of 120°, but which are captured with a time difference, so as to detect motion of a target or target object (to be imaged) based on a difference between the multiple wide angle images; and a display unit 5 such as a liquid crystal panel for displaying e.g. the wide angle images reproduced by the motion detection circuit 4.

The solid-state imaging element 2 is, for example, a CMOS (Complementary Metal Oxide Semiconductor) image sensor, and is fixed on a circuit board 6 (refer to FIG. 2). The solid-state imaging element 2 is connected to, and outputs image information, to the motion detection circuit 4 including an A/D (Analog-to-Digital) converter 8 which converts the image information to digital signals. The motion detection circuit 4 further comprises: a microprocessor 11 for controlling the entire operation of the motion detection circuit 4; and a TG (timing generator) 7 (claimed "rolling shutter means") for outputting, to the solid-state imaging element 2 and the A/D converter 8, timing signals to control timing of reading image information from the solid-state imaging element 2 at a predetermined timing under the control of the microprocessor 11 so as to allow the A/D converter 8 to output digital signals corresponding to the image information. Thus, it is evident that the reading of image information from the solid-state imaging element 2 is equivalent to the imaging of the capturing of the image information of the solid-state imaging element 2.

The motion detection circuit 4 still further comprises a DSP (Digital Signal Processor) 9 connected to the A/D converter 8 and controlled by the microprocessor 11 for receiving the digital signals from the A/D converter 8. The combination of the DSP 9 and the microprocessor 11 (claimed "image combining means" and "motion detection means") subjects the digital signals received by the DSP 9 to image processing to reproduce multiple wide angle images each corresponding to the original wide capture range, and produces a difference image between the wide angle images for the purpose of detecting motion of a target object.

Note that the read timing of reading image information from the solid state imaging element 2 is equivalent or corresponds to the imaging timing of capturing images by the solid state imaging element 2, because the solid-state imaging element 2 is a CMOS image sensor, and the reading of image information from the solid-state imaging element 2 is done based on the timing signals generated by the TG 7. Further note that the circuit board 6 has mounted thereon the TG 7, the A/D converter 8, the DSP 9 and the microprocessor 11 which form the motion detection circuit 4. A specific operation of the DSP 9 and the microprocessor 11 will be described in detail later.

Figure 3:
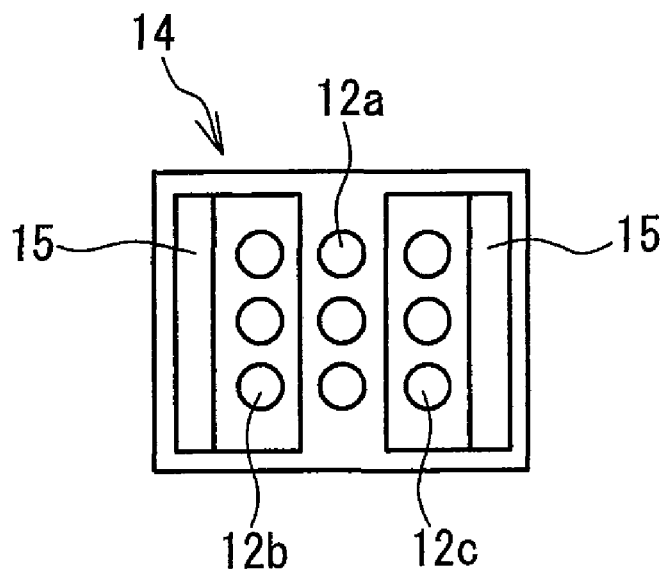
FIG. 3 is a schematic front view of the optical lens system of the motion detection imaging device.
Figure 4:
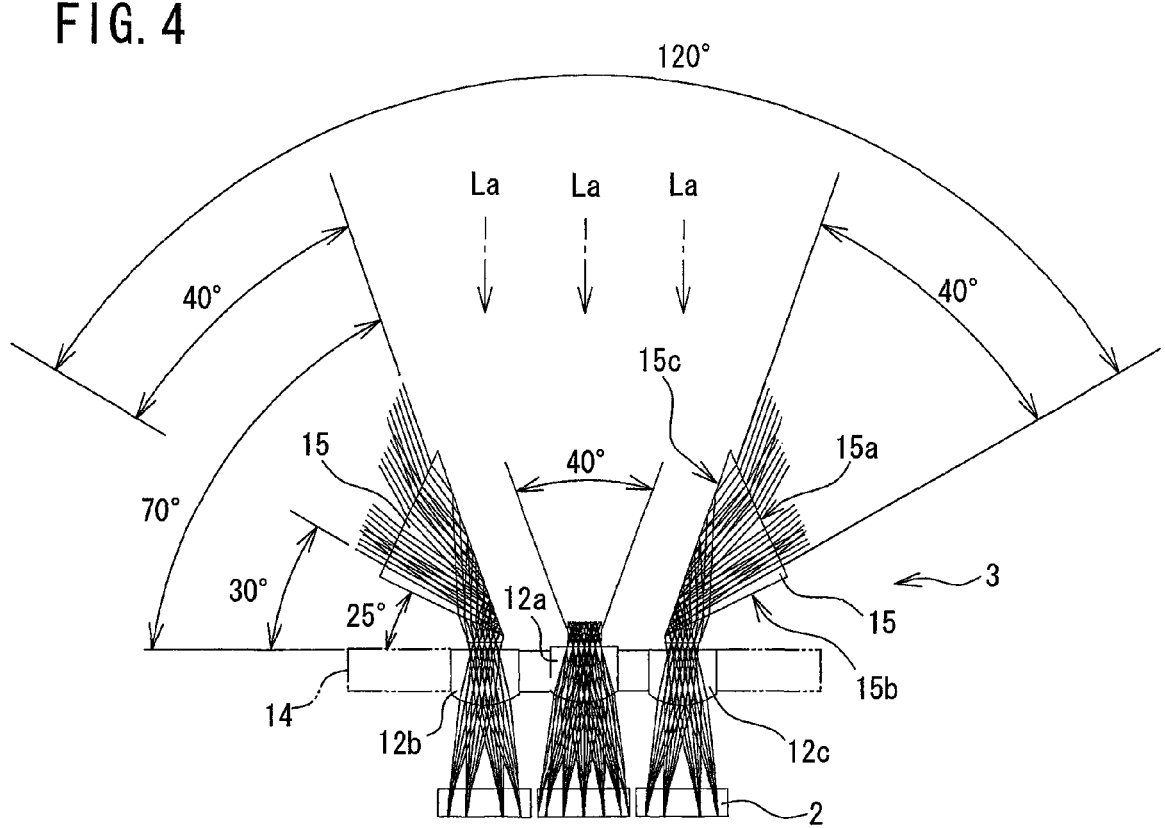
FIG. 4 is a schematic optical path diagram of the optical lens system of the motion detection imaging device as seen from the bottom thereof, showing a light flux passing through each of optical lenses.

Referring now to FIG. 3 and FIG. 4 in addition to FIG. 1 and FIG. 2, the optical lens system 3 will be described. FIG. 3 is a schematic front view of the optical lens system 3 of the motion detection imaging device 1 according to the first embodiment, in which the other parts corresponding to those in FIGS. 1 and 2, such as the motion detection circuit 4, are omitted for simplicity. As shown in FIG. 1, FIG. 2 and FIG. 3, the optical lens system 3 according to the present embodiment comprises: an optical lens array 14 having 9 (nine) optical lenses 12 (3 optical lenses 12a, 3 optical lenses 12b and 3 optical lenses 12c) which have mutually parallel optical axes La, and which are arranged in a matrix of 3 (three) rows and 3 (three) columns and integrally formed on a transparent substrate 13; and two 45-45-90 degree right-angle prisms 15 (claimed "light bending means") placed on the light entrance side of the optical lens array 14 to face the 3 optical lenses 12b and the 3 optical lenses 12c in the left and right columns of the matrix, respectively.

The optical lens system 3 further comprises: a lens holder 16 for holding and fixing the optical lens array 14 on the circuit board 6 with the solid-state imaging element 2; a prism holder 17 for holding and fixing the 45-45-90 degree right-angle prisms 15 on the lens holder 16; a partition wall member 18 for partitioning a space between the optical lenses 12 (12a, 12b, 12c) and the solid-state imaging element 2 into a matrix of spaces for the 9 optical lens 12 (12a, 12b, 12c), respectively; and an infrared cut filter 19. The matrix arrangement of the optical lens 12 (12a, 12b, 12c) is parallel to that of the unit pixels "u" of the solid-state imaging element 2. More specifically, the direction of the rows and the direction of the columns of the optical lenses 12 (12a, 12b, 12c) extend in the direction X (row direction) and the direction Y (column direction) shown in FIG. 1, respectively. Here, all the 9 optical lenses 12 (12a, 12b, 12c) have a view angle of approximately 40°.

The 45-45-90 degree right-angle prisms 15 have a cross-section of a right-angle isosceles triangle, and is inclined to the optical lens array 14 as shown in FIG. 2. A specific arrangement of the right-angle prisms 15 such as the inclination angle will be described in detail later. Note that the lens holder 16 has a front wall part facing the 45-45-90 degree right-angle prisms 15 and having 9 (nine) openings 16a for the 9 optical lenses 12 (12a, 12b, 12c), in which each opening 16a has a diameter smaller than that of each optical lens 12

(12a, 12b, 12c) so as to serve as a stop. Further note that the optical lenses 12 (12a, 12b, 12c) are not required to be integrally formed on the transparent substrate 13, and can be held by a lens holder so as to be arranged on a two-dimensional plane (X-Y plane in FIG. 1).

Reference is now made to FIG. 4 which is a schematic optical path diagram of the optical lens system 3 of the motion detection imaging device 1 as seen from the bottom thereof, showing a light flux passing through each of optical lenses 12a, 12b, 12c. As shown in FIG. 4, the three optical lenses 12a in the center column of the optical lens array 14 (such optical lenses 12a being hereafter referred to as "center lenses") directly receive light entering in a range of approximately 40° (which importantly is not larger than approximately 60°) in the capture range of 120°, while the three optical lenses 12b in the left column and the three optical lenses 12c in the right column of the optical lens array 14 (such optical lenses 12b and 12c being hereafter referred to as "side lenses") receive lights entering in left and right ranges each of approximately 40° (which also importantly is not larger than approximately 60°) in the capture range of 120° through the two 45-45-90 degree right-angle prisms 15, respectively, which guide the lights.

Each of the 45-45-90 degree right-angle prisms 15 is placed such that each 45-45-90 degree right angle prism 15 allows light to enter through an outward side 15a of the two sides thereof containing the right angle, and reflects the light by the hypotenuse 15c thereof, and further emits the light through the other side 15b thereof so as to bend and guide the light to each side lens 12 (12b, 12c), directing the light along the optical axis La of the each side lens 12 (12b, 12c) which collects the light to form images on the solid-state imaging element. In the present specification, surfaces of each 45-45-90 degree right-angle prism 15 for guiding and allowing light to enter through and for reflecting and emitting the light are referred to as "sides" and "hypotenuse" to describe such surfaces with reference to the optical path diagram of FIG. 4 (as well as optical path diagrams of FIGS. 9 and 10 described later).

More specifically, as shown in FIG. 4, each 45-45-90 degree right-angle prism 15 is arranged such that the side 15b facing each set of the three side lenses 12b, 12c is inclined at an angle of 25° to the major planes of the optical lens array 14, while the hypotenuse 15c is inclined at an angle of 70° to the major planes of the optical lens array 14. This makes it possible to prevent light entering the center lenses 12a from being interrupted, because no portion of the 45-45-90 degree right-angle prisms 15 exists in the front range of approximately 40° in the capture range of 120° as seen from the center lenses 12a. Each set of the three side lenses 12b, 12c collects light entering in the range of approximately 40° through the outward side 15a, which is one of the sides 15a, 15b containing the right-angle of the 45-45-90 degree right-angle prism 15, so as to form images of the light on the solid-state imaging element 2.

Figure 5:
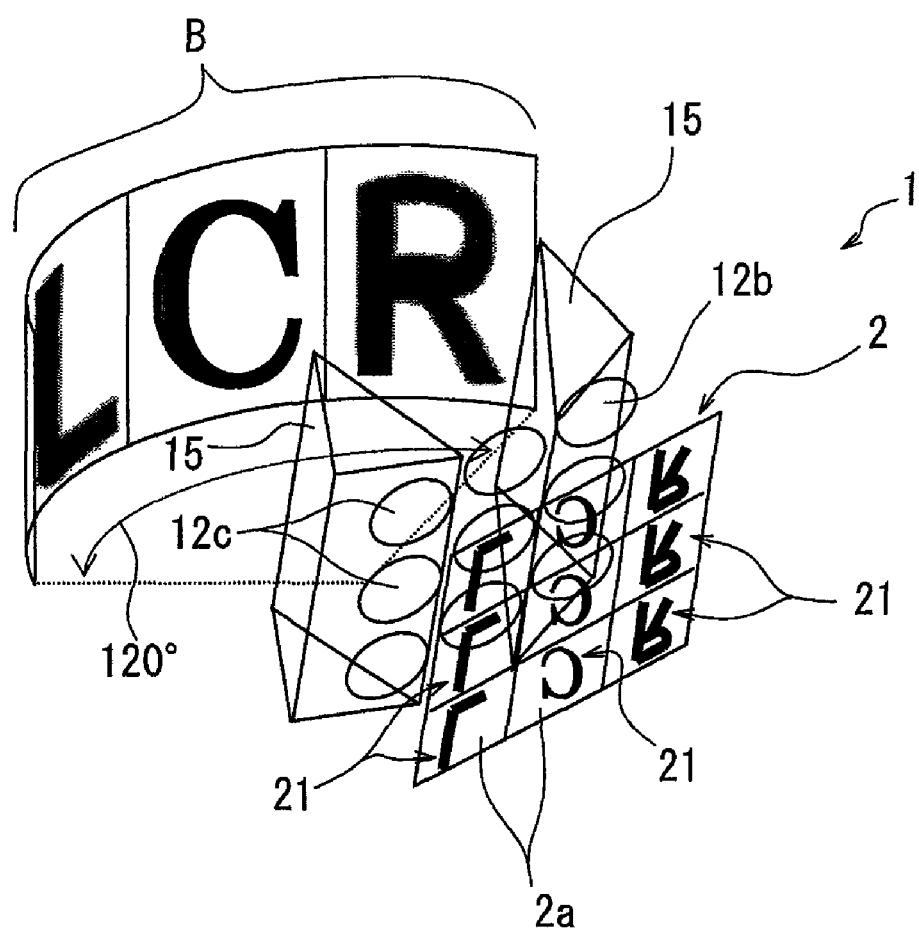
FIG. 5 is a schematic perspective view of a part of the motion detection imaging device along with a target object to be imaged, showing a relationship between the target object and an image formed on the solid state-imaging element.

Referring next to FIG. 5, the solid-state imaging element 2 as well as images formed on the solid-state imaging element 2 will be described below. FIG. 5 is a schematic perspective view of a part of the motion detection imaging device 1 of the present embodiment along with a target object to be imaged in a capture range B of 120° and having image segments of "L", "C" and "R", showing a relationship between the target object and an image formed on the solid state-imaging element 2. As shown in FIG. 5, the solid-state imaging element 2 has 9 (nine) image areas 2a in a matrix of 3 (three) rows and 3 (three) columns for imaging nine images 21 formed by the 9 (nine) optical lenses 12a, 12b, 12c (such images 21 and image areas 2a being hereafter referred to as "single-eye images" and "single-eye image areas", respectively).

The single-eye images 21 of "C" in the center column formed by the center lenses 12a are inverted up/down and left/right (rotated 180° about the central axis of the image plane) from the original image "C" in the image segment of "C" as seen from the motion detection imaging device 1. On the other hand, the single-eye images 21 of "L" and "R" in the left and right columns formed by the left and right side lenses 12b, 12c are only up/down inverted by the side lenses 12b, 12c and the 45-45-90 degree right-angle prism 15 from the original images "L" and "R" in the image segments of "L" and "R" as seen from the motion detection imaging device 1, because the 45-45-90 degree right-angle prisms 15 have a mirror effect.

Figure 6:
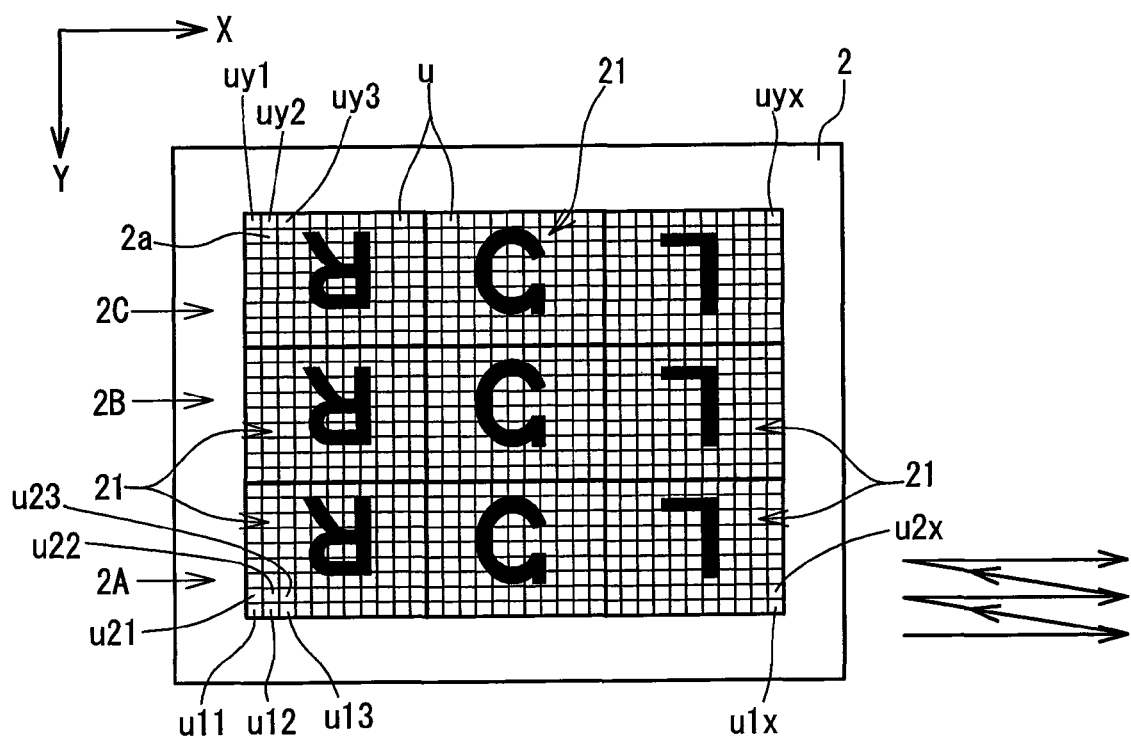
FIG. 6 is a schematic view showing three images of the target object formed on the solid-state imaging element as seen from the target object, so as to show states of formed single-eye images and sequence of reading unit pixels in the motion detection imaging device.

In the following, the process of ultimately reproducing an original image(s) of the target object in the capture range B will be described in detail with reference to FIG. 6 and FIG. 7. FIG. 6 is a schematic view showing three images of the target object formed on the solid-state imaging element 2 as seen from the target object (direction X and direction Y shown therein corresponding to those shown in FIG. 1), so as to show states of formed single-eye images 21 and sequence of reading the unit pixels "u". Here it is assumed that the target object placed in front of the motion detection imaging device 1 has equiangular (or equilength) image segments of "L", "C" and "R" in successive 40° ranges in the capture range (picture-taking range) B of 120°. In this case, the image segment of "C" (i.e. center image segment in the center range of approximately 40°) of the target image is inverted up/down and left/right by the center lenses 12a as described above to form three single-eye images 21 of "C" in the three single-eye image areas 2a in the center column on the solid-state imaging element 2, which are inverted only up/down from the original image of "C" when such single-eye images 21 of "C" are seen from the target object as shown in FIG. 6.

On the other hand, the image segment of "L" (left image segment in the left range of approximately 40°) and the image segment of "R" (right image segment in the right range of approximately 40°) of the target image are inverted left/right by the 45-45-90 degree right-angle prisms 15, respectively, and are then inverted up/down and left/right by the left and right side lenses 12b, 12c to form three single-eye images 21 of "L" and three single-eye images 21 of "R" in the left column and the right column on the solid-state imaging element 2, respectively. These single-eye images 21 of "L" and "R", when seen from the target object, are inverted up/down and left/right as shown in FIG. 6.

According to the present embodiment, these 9 (nine) single-eye images 21 are sequentially read out by the motion detection circuit 4 with a time difference, using sequential timing signals. More specifically, in this case, three sets of image information of the single-eye images 21 (each of "L", "C" and "R") are captured and read by three sets of single-eye image areas 2a in three rows extending in the same direction as the rows of the unit pixels "u" on the solid-state imaging element 2, respectively, as shown in FIG. 6 in a manner that the single-eye images 21 are read with a time difference from each other based on predetermined sequential timing signals generated by the TG 7. Such three sets of single-eye images 2a in three rows are hereafter referred to as "in-row single-eye image areas" which are designated by reference numerals 2A, 2B, 2C. This will be described in more detail below.

Referring to FIG. 6, unit pixels "u" in the lowermost line (row) of the solid-state imaging element 2 (i.e. lowermost line in the in-row single-eye image area 2A) are sequentially read first. More specifically, in the lowermost line, the TG 7 first provides a timing signal to read (start reading) a leftmost unit pixel u11, and then provides subsequent and consecutive timing signals to read subsequent unit pixels u12, u13, and so on to a rightmost unit pixel u1x, thereby ending reading of the unit pixels in the lowermost line. Then, the TG 7 provides timing signals to read unit pixels in the second line (second from the lowermost line), and to start reading a leftmost unit pixel u21 in the second line, and then provides subsequent timing signals to read subsequent unit pixels u22, u23, and so on to a rightmost unit pixel u2x in the second line, thereby ending reading of the unit pixels in the second line.

This sequence of reading the unit pixels "u" is indicated by bent arrow lines on the lower right side of FIG. 6. This sequence of reading is repeated until reading of all unit pixels uy1, uy2, uy3 to uyx in the uppermost line of the solid-state imaging element 2 (in the in-row single eye image area 2C) is completed through the in-row single-eye image areas 2A, 2B, 2C. Thus, according to the present embodiment, each timing signal provided by the TG 7 to each unit pixel in the manner described above allows a time difference in the reading operation between adjacent unit pixels. This, in turn, allows a time difference in the reading operation between adjacent such lines. At the same time, this allows a time difference in the reading operation between adjacent in-row single-eye image areas 2A, 2B, 2C. Besides, it is to be noted that an ordinary shutter is used here to capture image information on the solid-state imaging element 2. In the present embodiment, the image information of all the unit pixels "u" in all the lines (rows) as one image or frame shown in FIG. 6 are obtained by a single or one operation of the shutter.

Figure 7:
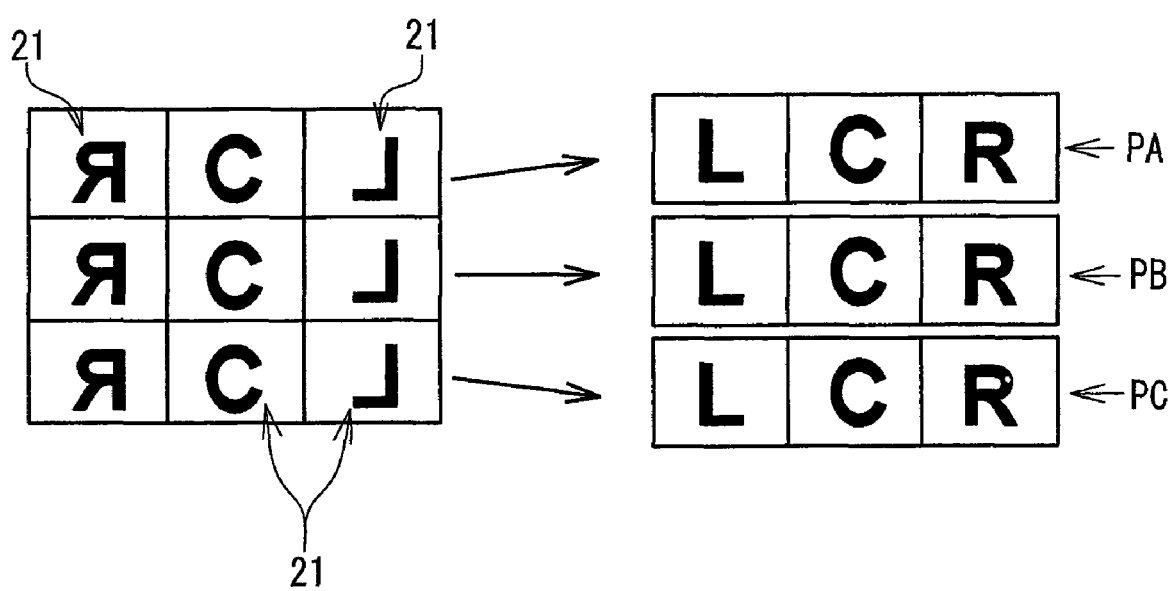
FIG. 7 is a schematic view for showing reproduction of three wide angle images from the single-eye images read from the solid-state imaging element in the motion detection imaging device.

FIG. 7 is a schematic view showing images of the target object which are, on the left, the 9 (nine) single-eye images 21 formed on the solid-state imaging element 2 corresponding to that of FIG. 6 as seen from the rear of the solid-state imaging element 2, and on the right, the corresponding 9 (nine) single-eye images 21 as processed by the combination of the DSP 9 and the microprocessor 11 for reproduction of the original image of the target object, so as to show reproduction of three wide angle images PA, PB, PC from the single-eye images 21 read from the solid-state imaging element 2. As shown on the left of FIG. 7, in the image information in each of the three sets of single-eye images 21 of "R", "C" and "L" in the 9 single-eye images 21 shown therein, the positions of the single-eye images 21 of "L" and "R" are exchanged with or reversed from the original positions of the image segments "L" and "R" on the target object.

In addition, the single-eye images 21 of "L" and "R" per se are inverted left/right from the original image segments of "L" and "R" on the target object. The image information in each of the three sets of single-eye images 21 of "R", "C" and "L" is processed by the combination of the DSP 9 and the microprocessor 11 to reverse (exchange) the positions of the single-eye images 21 of "R" and "L", and to invert the single-eye images 21 of "R" and "L" per se therein, thereby reproducing wide angle images PA, PB, PC (each of "L", "C" and "R") which correspond to the in-row single-eye image areas 2A, 2B, 2C, respectively, and which accurately reproduce the original image segments of the target object as shown on the right of FIG. 7.

More specifically, the combination of the DSP 9 and the microprocessor 11 reverses or exchanges the position of the left/right inverted single-eye image 21 of "R" (in the right approximately 40° range) and the position of the left/right inverted single-eye image 21 of "L" (in the left approximately 40° range) in each of the in-row single-eye image areas 2A, 2B, 2C, and then mirror-inverts the single-eye image 21 of "L" and the single-eye image 21 of "R" back to a normal single-eye image of "L" and a normal single-eye image of "R", respectively. The combination of the DSP 9 and the microprocessor 11 then further combines these normal single-eye images of "L" and "R" with the center single-eye image 21 of "C" (in the center approximately 40° range), so as to reproduce or form wide angle images PA, PB, PC each with a picture angle of 120°.

An advantage of the motion detection imaging device 1 according to the present embodiment here is that the respective single-eye images 21 have substantially no distortions at peripheries thereof because the optical lenses 12a, 12b, 12c have a view angle as small as approximately 40° which is not larger than 60°, so that no complex process of distortion correction for the respective single-eye images 21 is required when combining the single-eye images 21. Furthermore, since each of the three single-eye images 21 ("L", "C" and "R") is an image in a range of approximately 40°, the three single-eye images 21 can be combined with substantially no overlap between adjacent two of the three single-eye images 21.

As described above, the three wide angle images PA, PB, PC are reproduced from the in-row single-eye image areas 2A, 2B, 2C, respectively, which are sequentially read from the solid-state imaging element 2 with a time difference (in the timing of reading the unit pixels from the solid-state imaging element 2). Accordingly, the wide angle images PA, PB, PC show three states of the target object along the time flow in this order (PA→PB→PC). In the above example shown in FIGS. 5, 6 and 7, the target object with the image of "L", "C" and "R" stays still, so that the three reproduced wide angle images PA, PB, PC are identical to each other. However, if the target object is a moving object, the three reproduced wide angle images become different from each other, reflecting the movement of the target object. An operation of the motion detection imaging device 1 for a moving object will be described below with reference to FIG. 8.

Figure 8:
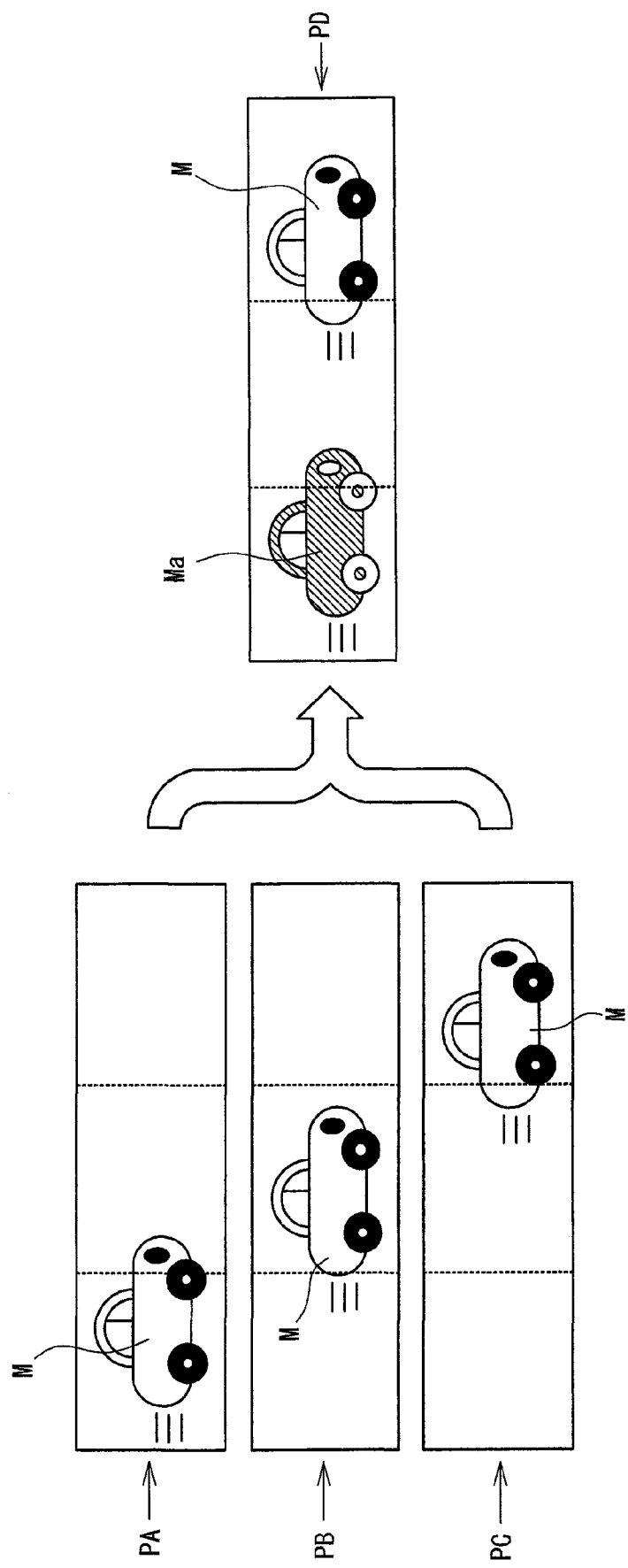
FIG. 8 is a schematic view for showing a process of producing a difference image from the three reproduced wide angle images in the motion detection imaging device.

FIG. 8 is a schematic view showing, on the left, 3 (three) reproduced wide angle images PA, PB, PC containing an image M of a car as a moving target object, and, on the right, a difference image PD between the wide angle images PC and PA, for the purpose of showing a process of producing the difference image PD from the reproduced wide angle images PA, PB, PC. Here, it is assumed that a car moving from left to right in the capture range B (corresponding to the direction from "L" to "R" in FIGS. 5, 6 and 7) is imaged by the motion detection imaging device 1 as an image M. Under this assumption, the three wide angle images PA, PB, PC shown on the left of FIG. 8 are reproduced. The three wide angle images PA, PB, PC are images which are captured in this order along the time flow or with the elapse of time.

The microprocessor 11 then digitally subtracts the wide angle image PA from the wide angle image C to produce a difference image PD shown on the right of FIG. 8. By this subtraction, the image M in the wide angle image PA is inverted in polarity to a negative image Ma in the difference image PD. The microprocessor 11 determines movement or motion of a target object (car) based the presence or absence of such negative image in the difference image PD. Note that since the three wide angle images PA, PB, PC are present here, it is also possible for the microprocessor 11 to perform a subtraction between the wide angle images PA and PB, or between the wide angle images PB and PC for the purpose of motion detection.

As described in the foregoing, the motion detection imaging device 1 of the present embodiment can have a simple structure, and its entire size can be easily reduced, because the optical lens system is formed of the optical lens array 14 having the 9 optical lenses 12a, 12b, 12c in the matrix of 3 rows and 3 columns along with the 45-45-90 degree right-angle prisms 15 placed facing the optical lenses 12b and 12c which are the side lenses in the left and right columns. Furthermore, the motion detection imaging device 1 can easily, and at short intervals, capture multiple images for motion detection, making it possible to detect a target object with high probability even when the target object such as a car M moves at a high speed. This is because the three wide angle images PA, PB, PC with a time difference are read out by a single or one operation of a shutter (to read all the unit pixels u1 to ux captured by the 9 optical lenses on the solid-state imaging element 2), and because the motion of the target object in the capture range B of approximately 120° is detected based on a difference between the wide angle images PA, PB, PC. Thus, when used and mounted on the rear of a car as a rear monitor camera system, for example, the motion detection imaging device 1 of the present embodiment, while small in size, can monitor a wide capture range at the rear of the car, making it possible to detect, with high probability, e.g. a car moving at a high speed.

Second Embodiment

Figure 9:
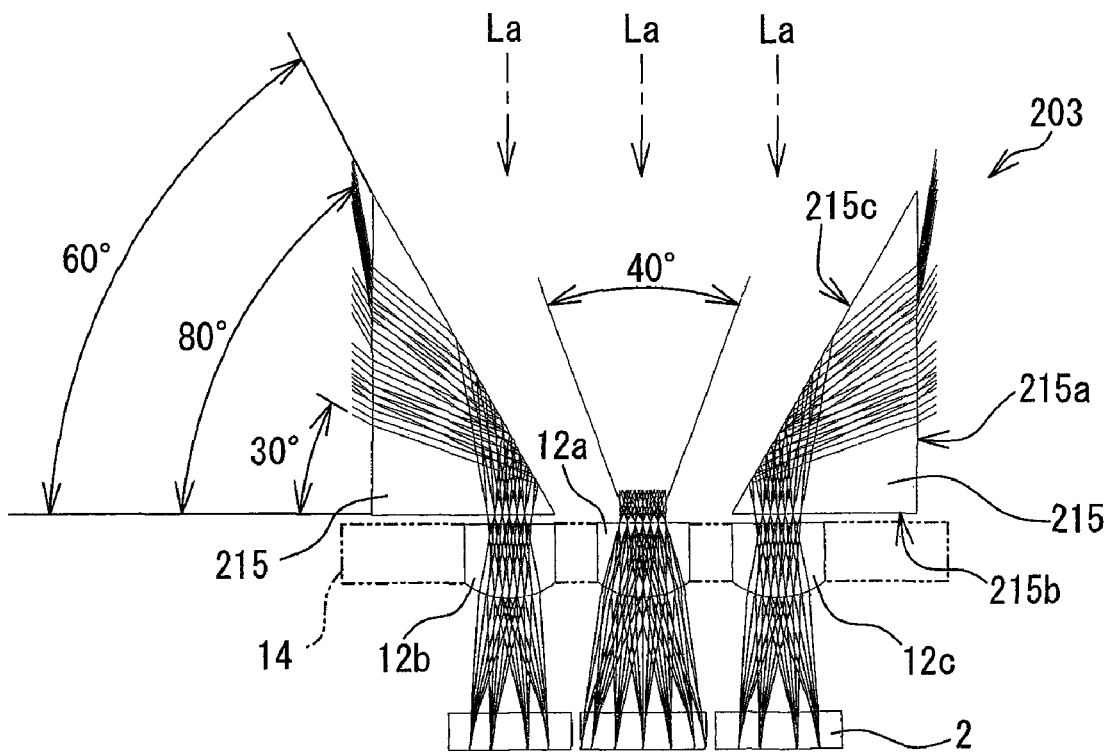
FIG. 9 is a schematic optical path diagram of an optical lens system of a motion detection device according to a second embodiment of the present invention as seen from the bottom thereof, showing a light flux passing through each of the optical lenses.

Referring to FIG. 9, a motion detection device 1 according to a second embodiment of the present invention will be described. The motion detection device 1 of the second embodiment is similar to that of the first embodiment, except that 30-60-90 degree right-angle prisms 215 (claimed "light bending means") are placed on the entrance side of the optical lens array 14 here in place of the 45-45-90 degree right-angle prisms 15 used in the first embodiment. FIG. 9 is a schematic optical path diagram of an optical lens system 203 of the motion detection device 1 according to the second embodiment as seen from the bottom thereof, showing a light flux passing through each of the optical lenses 12a, 12b, 12c. Similarly as in the first embodiment, the optical lens system 203 has an optical lens array 14 of optical lenses 12a, 12b, 12c and a solid-state imaging element 2. Thus, description of parts similar to those in the first embodiment is omitted where appropriate.

As shown in FIG. 9, the 30-60-90 degree right-angle prisms 215 of the second embodiment are placed at positions facing the left and right side lenses 12b and 12c. The 30-60-90 degree right-angle prisms 215 have a cross-section of a right triangle with 30 and 60 degree angles in addition to its right angle. Each of the 30-60-90 degree right-angle prisms 215 has two sides, a longer side 215a and a shorter side 215b, containing the right angle in addition to a hypotenuse 215c, in which the shorter side 215b is parallel to the major planes of the optical lens array 14, while the longer side 215a is positioned outside and extends vertically from an outer end of the shorter side 215b. Thus, the hypotenuse 215c is inclined at an angle of 60° to the major planes of the optical lens array 14.

Each of the 30-60-90 degree right-angle prisms 215 for guiding light is placed such that each 30-60-90 degree right-angle prism 215 allows light to enter through the longer side 215a thereof in each of the left and right ranges each of approximately 40° (which importantly is not larger than approximately 60°) in the capture range of approximately 120°, and reflects the light by the hypotenuse 215c thereof, and further emits the light through the shorter side 215b thereof so as to bend and guide the light to each of the set of three left side lenses 12b and the set of three right side lenses 12c, directing the light along the optical axis La of each side lens 12b, 12c, so that the set of three left side lenses 12b and the set of three right side lenses 12c collect the lights to form, on the solid-state imaging element 2, left and right images for the left and right ranges each of approximately 40°.

Similarly as in the first embodiment, the left and right images 21 (single-eye images) formed by the side lenses 12b, 12c in the left and right ranges each of approximately 40° are combined by the DSP 9 and the microprocessor 11 with center images 21 (single-eye images) in the center range of approximately 40° (which also importantly is not larger than approximately 60°) formed by the center lenses 12a so as to reproduce wide angle images PA, PB, PC with a picture angle of approximately 120°. Based on a difference between the wide angle images PA, PB, PC, the movement or motion of a target object imaged in the wide angle images PA, PB, PC is detected.

Each of the 30-60-90 degree right-angle prisms 215 for guiding light in the present embodiment is arranged such that the hypotenuse 215c of each 30-60-90 degree right-angle prism 215 is inclined at an angle of 60° to the major planes of the optical lens array 14. This makes it possible to prevent light entering the center lenses 12a from being interrupted, because no portion of the 30-60-90 degree right-angle prisms 215 exists in the front range of approximately 40° in the capture range of 120° as seen from the center lenses 12a. In addition, similarly as in the first embodiment, the single-eye images 21 formed by the optical lenses 12a, 12b, 12c have substantially no distortions at peripheries thereof because all single-eye images 21 are images captured in a capture range as small as approximately 40°, so that no complex process of distortion correction for the single-eye images 21 is required when combining the single-eye images 21. Furthermore, since each of the single-eye images 21 is an image in a range of approximately 40°, the center single-eye images 21 can be combined with the left and right single-eye images 21 with substantially no overlap between adjacent two of the single-eye images 21.

Third Embodiment

Figure 10:
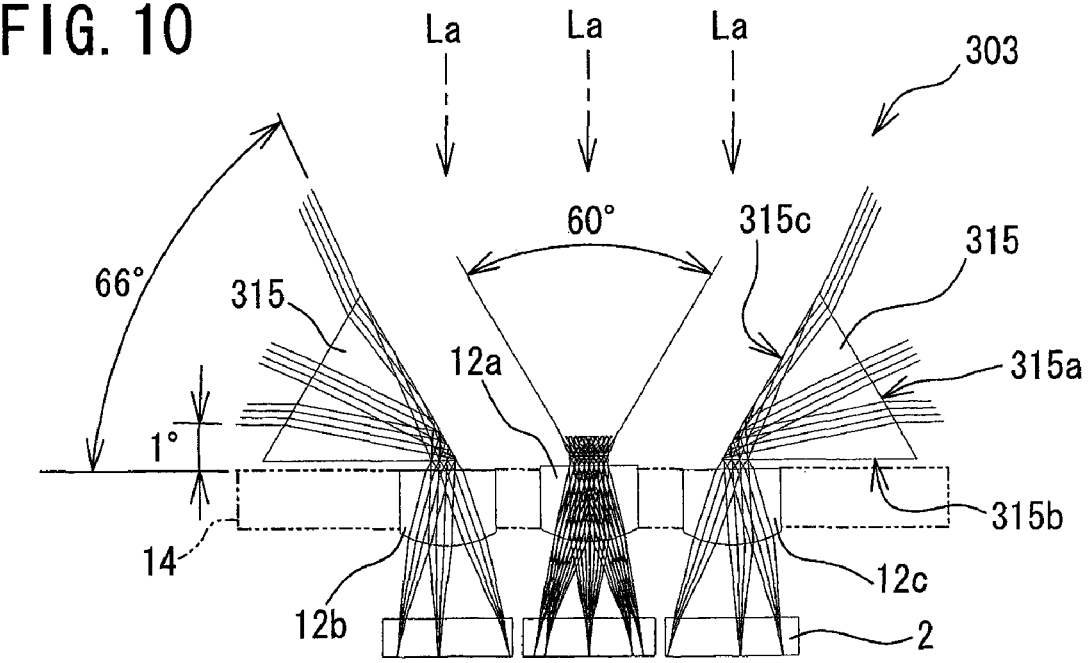
FIG. 10 is a schematic optical path diagram of an optical lens system of a motion detection imaging device according to a third embodiment of the present invention as seen from the bottom thereof, showing a light flux passing through each of the optical lenses.

Referring next to FIG. 10, a motion detection device 1 according to a third embodiment of the present invention will be described. The motion detection device 1 of the third embodiment is similar to that of the first embodiment, except that the nine optical lenses 12a, 12b, 12c have a capture range of 60° or approximately 60° (which importantly is not larger than approximately 60°) to expand the capture range of the optical lens system 3 of the first embodiment to approximately 180°, and that equilateral triangle prisms 315 (claimed "light bending means") for guiding light are placed on the light entrance side of an optical lens array 14 in place of the 45-45-90 degree right-angle prisms 15 of the first embodiment. FIG. 10 is a schematic optical path diagram of an optical lens system 303 of the motion detection imaging device 1 according to the third embodiment as seen from the bottom thereof, showing a light flux passing through each of the optical lenses 12a, 12b, 12c. Similarly as in the first embodiment, the optical lens system 303 has an optical lens array 14 of optical lenses 12a, 12b, 12c and a solid-state imaging element 2. Thus, description of parts similar to those in the first embodiment is omitted where appropriate.

As shown in FIG. 10, the equilateral triangle prisms 315 prisms of the third embodiment are placed at positions facing the left and right side lenses 12b, 12c. The equilateral triangle prisms 315 have a cross-section of an equilateral triangle. Each equilateral triangle prism 315 has three sides 315a, 315b, 315c, in which the side 315b is parallel to the major planes of the optical lens array 14. Thus, the inward side 315c is inclined at an angle of 60° to the major planes of the optical lens array 14. Each equilateral triangle prism 315 for guiding light is placed such that each equilateral triangle prism 315 allows light to enter through the outward side 315a thereof in each of the left and right ranges each of approximately 60° (which importantly is not much larger than approximately 60°) in the capture angle of approximately 180°, and reflects the light by the inward side 315c thereof, and further emits the light through the side 315b thereof so as to bend and guide the light to each size lens 12b, 12c, directing the light along the optical axis La of each side lens 12b, 12c, so that the side lenses 12b, 12c collect the lights to form, on the solid-state imaging element 2, left and right images for the left and right ranges each of approximately 60°.

Similarly as in the first embodiment, the left and right images 21 (single-eye images) in the left and right ranges each of approximately 60° are combined by the DSP 9 and the microprocessor 11 with the center images 21 (single-eye images) in the center range of approximately 60° formed by the center lenses 12a so as to reproduce wide angle images PA, PB, PC with a picture angle of approximately 180°. Based on a difference between the wide angle images PA, PB, PC, the movement or motion of a target object imaged in the wide angle images PA, PB, PC is detected. Each equilateral triangle prism 315 in the present embodiment is arranged such that the inward side 315c of the equilateral triangle prism 315 is inclined at an angle of 60° to the major planes of the optical lens array 14. This makes it possible to prevent light entering the center lenses 12a from being interrupted, because no portion of the equilateral triangle prisms 315 exists in the front range of approximately 60° in the capture range of 180° as seen from the center lenses 12a.

As apparent from the description herein, this third embodiment shows that the motion detection imaging device 1 can be advantageously used to reproduce a wide angle image or images with a picture angle of approximately 180° while the first and second embodiments as well as the fourth embodiment described later shows that the motion detection imaging device 1 can be advantageously used to reproduce a wide angle image or images with a picture angle of approximately 120°. This indicates that the motion detection imaging device 1 can be advantageously used to reproduce a wide angle image or images with a picture angle of at least approximately 120°.

Note that in the case of the third embodiment, the left and right capture ranges for the light entrance into the left and right equilateral triangle prisms 315 may become wider than the above-described range of 60°, so that the view angle of each of the single-eye images 21 formed by the two sets of side lenses 12b, 12c may correspondingly become wider than 60°. For example, the capture range may become 65° (66°−1°) as indicated in the view of the left equilateral triangle prism 315 in FIG. 10. This can be adjusted by increasing overlap between adjacent two of the single-eye images 21. Also note that in the case of the third embodiment, there is a possibility that the respective single-eye images 21 on the solid-state imaging element 2 may have some distortions at peripheries thereof because the optical lenses 12a, 12b, 12c have a capture (view) angle as large as 60°. This can be solved by using a combined lens consisting of two or three lenses for each of the optical lenses 12a, 12b, 12c, thereby reducing such distortions to an extent that gives practically no problem.

Fourth Embodiment

Referring finally to FIG. 11, a motion detection device 1 according to a fourth embodiment of the present invention will be described. The motion detection device 1 of the fourth embodiment is similar to that of the first embodiment, except that that a pair of first mirrors 415a are placed at positions facing left and right side lenses 12b, 12c in place of the 45-45-90 degree right-angle prisms 15, respectively, while a pair of second mirrors 415b are placed at positions facing the pair of first mirrors 415a, respectively. The combination of the pairs of first and second mirrors 415a, 415b correspond to the claimed "light bending means". FIG. 11 is a schematic optical path diagram of an optical lens system 403 of the motion detection imaging device 1 according to the fourth embodiment as seen from the bottom thereof, showing a light flux passing through each of the optical lenses 12a, 12b, 12c. Similarly as in the first embodiment, the optical lens system 403 has an optical lens array 14 of optical lenses 12a, 12b, 12c and a solid-state imaging element 2. Thus, description of parts similar to those in the first embodiment is omitted where appropriate.

As shown in FIG. 11, each of the first mirrors 415a is inclined at an angle of approximately 30° to the major planes of the optical lens array 14. The pair of second mirrors 415b are placed at positions outside the left and right side lenses 12b, 12c, respectively, so as to prevent interruption of lights which are reflected from the pair of first mirrors 415a, and directed to the side lenses 12b, 12c, respectively. No portion of the pairs of first and second mirrors 415a, 415b exists in the front range of approximately 40° in a capture range of 120° as seen from the center lenses 12a. This makes it possible to prevent light in the capture range entering the center lenses 12a from being interrupted.

Each set of the first mirror 415a and the second mirror 415b for guiding light is placed such that such each set allows light to enter in each of the left and right ranges each of approximately 40° (which importantly is not larger than approximately 60°) in the capture range of approximately 120°, and reflects the light by the second mirror 415b and then by the first mirror 415a so as to bend and guide the light to each of the left and right side lenses 12b, 12c, directing the light along the optical axis La of each side lens 12b, 12c, so that the side lens 12b, 12c collect the lights to form, on the solid-state imaging element 2, left and right images 21 (single-eye images) for the left and right ranges each of approximately 40°. On the other hand, light in the center range of approximately 40° in the capture range of approximately 120° directly enters, and is collected by, the center lenses 12a so as to form a center image 21 (single-eye image) for the center range of approximately 40° on the solid-state imaging element 2.

Similarly as in the first embodiment, the left and right images 21 (single-eye images) in the left and right ranges each of approximately 40° are combined by the DSP 9 and the microprocessor 11 with the center image 21 (single-eye image) in the center range of approximately 40° (in a total capture range of approximately 120°) so as to reproduce wide angle images PA, PB, PC with a picture angle of approximately 120°. Based on a difference between the wide angle images PA, PB, PC, the movement or motion of a target object imaged in the wide angle images PA, PB, PC is detected. Note that an advantage of the motion detection imaging device 1 according to the present embodiment is that the left and right single-eye images 21 are not inverted left/right from corresponding original images, so that the image reproduction process by the combination of the DSP 9 and the microprocessor 11 can thereby be simplified.

It is to be noted that the present invention is not limited to the above embodiments, and various modifications are possible within the spirit and scope of the present invention. For example, the first to fourth embodiments have been described as using an optical lens array 14 which has optical lenses 12 arranged in a matrix of 3 rows and 3 columns. However, the optical lenses 12 can be arranged in a matrix of n rows and m columns placed in parallel to the rows and columns of the unit pixels "u" forming the solid-state imaging element 2, where n is an integer of 2 or more, and m is an integer of 3 or more. Furthermore, the rolling shutter means is not limited to the TG (timing generator) 7, but can be a timing signal generating means built in the microprocessor 11.

The present invention has been described above using presently preferred embodiments, but such description should not be interpreted as limiting the present invention. Various modifications will become obvious, evident or apparent to those ordinarily skilled in the art, who have read the description. Accordingly, the appended claims should be interpreted to cover all modifications and alterations which fall within the spirit and scope of the present invention.

This application is based on Japanese patent application 2006-203443 filed Jul. 26, 2006, the content of which is hereby incorporated by reference.

What is claimed is:

1. A motion detection imaging device comprising:
a solid-state imaging element with unit pixels arranged in a matrix of rows and columns; and
an optical lens system for collecting lights entering in a capture range so as to form, on the solid-state imaging element, images which are imaged with a time difference so as to detect movement of a target object in the images based on a difference between the imaged images,
the optical lens system comprising:
an optical lens array having multiple optical lenses (hereafter referred to as "center lenses") which are arranged in the direction of the columns of the unit pixels, and into which a light in a predetermined front range in the capture range enters, and also having two sets of multiple optical lenses (hereafter referred to as "left and right side lenses") which are arranged left and right of the center lenses and in the direction of the columns of the unit pixels, and into which lights in predetermined left and right ranges in the capture range enter; and
light bending means placed on entrance side of the left and right side lenses for bending and guiding lights entering in the predetermined left and right ranges in the capture range to the left and right side lenses, respectively, directing the lights along optical axes of the left and right side lenses,
the solid-state imaging element having image areas for respectively imaging multiple images (hereafter referred to as "single-eye images") formed by the center lenses and the left and right side lenses (such image areas being hereafter referred to as "single-eye image areas"),
wherein the motion detection imaging device further comprises:
rolling shutter means for allowing the solid-state imaging element to image the single-eye images with a time difference between the single-eye images in the single-eye image areas (hereafter referred to as "in-row single-eye image areas") in adjacent rows of the in-row single-eye image areas, the rows extending in the same direction as the rows of the unit pixels;
image combining means for combining, in each of the in-row single-eye image areas, the single-eye images formed by the center lenses from the light entering in the predetermined front range in the capture range with the single-eye images formed by the left and right side lenses from the lights entering in the predetermined left and right ranges in the capture range so as to reproduce a wide angle image, thereby reproducing multiple wide angle images with a time difference between the in-row single-eye image areas; and
motion detection means for detecting the target object in the wide angle images based on a difference between the wide angle images reproduced by the image combining means from the single-eye images in the in-row single-eye image areas, respectively.

2. The motion detection imaging device according to claim 1, wherein the light bending means comprises prisms.

3. The motion detection imaging device according to claim 2, wherein the light bending means comprises 45-45-90 degree right-angle prisms.

4. The motion detection imaging device according to claim 2, wherein the light bending means comprises 30-60-90 degree right-angle prisms.

5. The motion detection imaging device according to claim 1, wherein the light bending means comprises mirrors.

6. A motion detection imaging device comprising:
a solid-state imaging element with unit pixels arranged in a matrix of rows and columns; and
an optical lens system for collecting lights entering in a capture range so as to form, on the solid-state imaging element, images which are imaged with a time difference so as to detect movement of a target object in the images based on a difference between the imaged images,
the optical lens system comprising:
an optical lens array having three optical lenses (hereafter referred to as "center lenses") which are arranged in the direction of the columns of the unit pixels, and into which a light in a front range of approximately 40° in the capture range enters, and also having two sets of three optical lenses (hereafter referred to as "left and right side lenses") which are arranged left and right of the center lenses and in the direction of the columns of the unit pixels, and into which lights in left and right ranges each of approximately 40° in the capture range enter; and
left and right 45-45-90 degree right-angle prisms placed on entrance side of the left and right side lenses, respectively, so as to prevent interruption of the lights entering in the front range of approximately 40° and to bend and guide lights entering in the left and right ranges each of approximately 40° in the capture range to the left and right side lenses, respectively, directing the lights along optical axes of the left and right side lenses,
the solid-state imaging element having nine image areas in a matrix of three rows and three columns for respectively imaging nine images (hereafter referred to as "single-eye images") formed by the center lenses and the left and right side lenses (such image areas being hereafter referred to as "single-eye image areas"),
wherein the motion detection imaging device further comprises:
rolling shutter means for allowing the solid-state imaging element to image the single-eye images with a time difference between the single-eye images in the single-eye image areas (hereafter referred to as "in-row single-eye image areas") in adjacent rows of the in-row single-eye image areas, the rows extending in the same direction as the rows of the unit pixels;
image combining means for combining, in each of the in-row single-eye image areas, three single-eye images formed by the center lenses from the light entering in the front range of approximately 40° in the capture range with three single-eye images formed by each of the left and right side lenses from the lights entering in the left and right ranges each of approximately 40° in the capture range so as to reproduce a wide angle image, thereby reproducing wide angle images each with a picture angle of at least approximately 120° with a time difference between the in-row single-eye image areas; and motion detection means for detecting the target object in the wide angle images based on a difference between the wide angle images reproduced by the image combining means from the single-eye images in the in-row single-eye image areas, respectively.

* * * * *